(12) United States Patent
Dobson et al.

(10) Patent No.: US 8,678,050 B2
(45) Date of Patent: Mar. 25, 2014

(54) OVERFLOW PROTECTION DEVICE FOR AN OIL TANK TRAILER

(75) Inventors: Glyn Dobson, Marwayne (CA); Mathew Jones, Marwayne (CA)

(73) Assignee: Advanced Spill Protection System, Lashburn, Saskatchewan (CA)

( * ) Notice: Subject to any disclaimer, the term of this patent is extended or adjusted under 35 U.S.C. 154(b) by 284 days.

(21) Appl. No.: 13/095,299

(22) Filed: Apr. 27, 2011

(65) Prior Publication Data

US 2013/0192683 A1   Aug. 1, 2013

(51) Int. Cl.
| B65B 1/30 | (2006.01) |
| B65B 3/28 | (2006.01) |
| B65B 57/06 | (2006.01) |
| B65B 57/14 | (2006.01) |
| F16K 31/18 | (2006.01) |

(52) U.S. Cl.
USPC ............. 141/198; 141/95; 141/303; 137/413

(58) Field of Classification Search
USPC .................. 137/413, 386; 141/95, 198, 303; 417/26, 28, 34
See application file for complete search history.

(56) References Cited

U.S. PATENT DOCUMENTS

| 3,963,146 | A | | 6/1976 | Esbjörnsson |
| 4,057,364 | A | * | 11/1977 | Bratschitsch ................... 417/34 |
| 4,275,382 | A | * | 6/1981 | Jannotta ................... 340/870.16 |
| 4,649,968 | A | * | 3/1987 | Berrettini et al. ............... 141/95 |
| 4,903,672 | A | | 2/1990 | MacKinnon |
| 5,052,223 | A | | 10/1991 | Regnault et al. |
| 5,187,979 | A | | 2/1993 | Edmark, III |
| 5,226,320 | A | | 7/1993 | Däges et al. |
| 5,406,843 | A | | 4/1995 | Hannan et al. |
| 5,524,682 | A | * | 6/1996 | Amonson ....................... 141/95 |
| 5,632,302 | A | | 5/1997 | Lenoir et al. |
| 6,154,144 | A | | 11/2000 | Johnson |
| 6,229,448 | B1 | | 5/2001 | Bennett, Jr. et al. |

* cited by examiner

*Primary Examiner* — John Rivell
*Assistant Examiner* — Hailey K Do
(74) *Attorney, Agent, or Firm* — Eric L. Lane

(57) ABSTRACT

An overflow protection system for an oil tank trailer which automatically monitors and controls the level of oil within said trailer. The system comprises a float sensor, a cable assembly, a shutoff valve, a temperature sensor, and a control box. The float sensor comprises an inductive float sensor which monitors the level on the tank gauge of an existing trailer body, which provides electrical signals via the cable assembly. The cable assembly provides electronic connection between the float sensor, valve, temperature sensor, and control box. The shutoff valve is closed when the float sensor is triggered, preventing flow into and out of the tank in order to eliminate overflow spillage. The control box includes a plurality of manual user controls for operating the system as well as information displays including interior temperature and the like.

9 Claims, 3 Drawing Sheets

OVERFLOW PROTECTION DEVICE FOR AN OIL TANK TRAILER

RELATED APPLICATIONS

The present invention was first described in a notarized Official Record of Invention on Nov. 9, 2009, that is on file at the offices of Montgomery Patent and Design, LLC, the entire disclosures of which are incorporated herein by reference.

FIELD OF THE INVENTION

The present invention relates generally to oil tank trailers, and in particular, to an overflow protection device for an oil tank trailer.

BACKGROUND OF THE INVENTION

In modern society, we rely greatly on the use of oil for heating, transportation, and energy needs. The vast majority of this oil is transported via a tanker trailer. The filling of a tanker trailer with oil is a somewhat complicated process. There are many factors to be considered such as the temperature of the incoming oil, capacity of the tanker trailer, current fill status, and the like.

Unfortunately, many tanker trailers are only equipped with a simple level gauge which severely limits the amount of information available to the filling operator.

As such, many instances of overfilling occur on a daily basis. Such overfill situations are dangerous, costly to clean up, and may also result in EPA violations.

Various attempts have been made to provide liquid tank monitoring and overflow protection systems and apparatuses. Examples of these attempts can be seen by reference to several U.S. patents, such as U.S. Pat. Nos. 4,903,672; 5,052,223; 5,187,979; 5,226,320; 5,632,302; 6,154,144; and 6,229,448.

While these systems fulfill their respective, particular objectives, each of these references suffer from one (1) or more of the aforementioned disadvantages. Many such systems are only utilized with stationary tanks and unsuited for use with oil tank trailers. In addition, while many such apparatuses monitor or measure fluid levels, they are not capable of automatic operation in response to fluid conditions. Furthermore, many such systems are not able to be incorporated with existing tank trailer electrical and mechanical components. Also, many such systems do not provide additional manual operation and data readout beyond fluid level to allow a user to make educated decisions while filling a tank. Accordingly, there exists a need for an overflow protection device for an oil tank trailer without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a system incorporated with existing components of an oil tank trailer to augment normal operation by providing detailed measurements and readout for enhanced manual decision making and automatic overflow protection. Thus, the object of the present invention is to solve the aforementioned disadvantages and provide for this need.

To achieve the above objectives, it is an object of the present invention to prevent overfilling of a tank of a tanker truck with oil. The system includes an air-operated control valve in communication with the tank, a pump having a solenoid for pumping oil into the tank, a parking brake coupled to the tanker truck, a float sensor within the tank for monitoring the fluid level within the tank, and a control box positioned on an exterior of the tank. Overfill prevention is accomplished by monitoring the oil level within the tank and utilizing the oil level to automatically control the pump.

Another object of the present invention is to include an operating mode switch within the control box which enables a user to choose various operating modes for the air-operated control valve including a continuously open position, a continuously closed position, and an automatically-operating mode wherein the control valve is closed when the tank level reaches a predetermined fill level.

Yet still another object of the present invention is to prevent further accidents by disabling the system when the parking brake is not active.

Yet still another object of the present invention is to provide additional data for accurate assessment of conditions within the interior of the tank by including a temperature sensor within the tank. The temperature sensor provides a display signal to a temperature readout on the control panel to aid a user in making decisions regarding pump operation.

Yet still another object of the present invention is to provide override and test operations including visual and audible alarms for assessing the working condition of the system prior to use.

Yet still another object of the present invention is to provide a method of utilizing the device that provides a unique means of acquiring the system, activating the tanker truck parking brake, testing the system, positioning the operating mode switch in either the open or automatic position as desired, utilizing the temperature information displayed by the readout in the decision making process, and providing automatic stopping of the pump.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
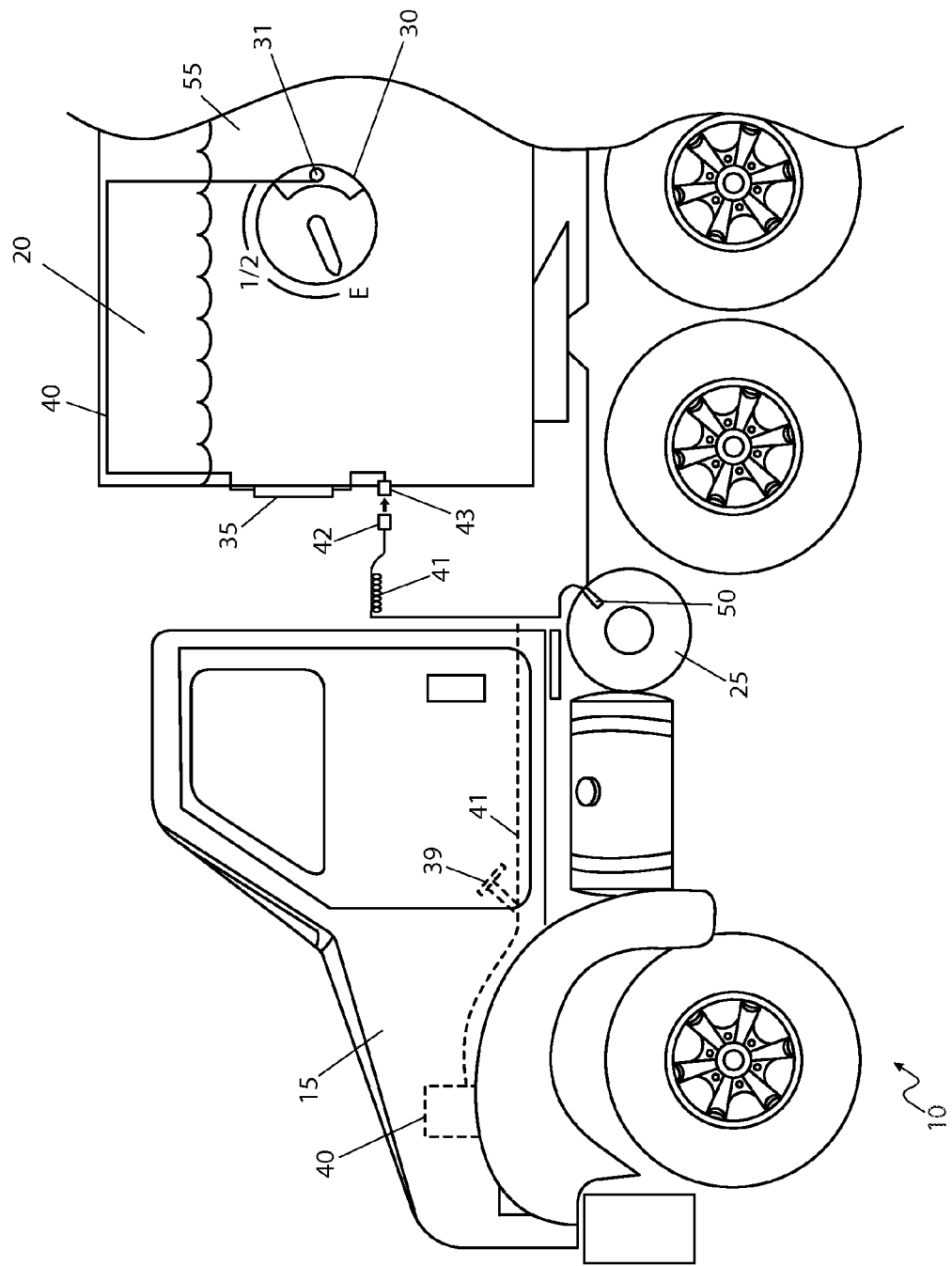
FIG. 1 is a side view of a tanker truck fluid level control system 10 as provided upon a tanker truck 15, according to the preferred embodiment of the present invention.

DESCRIPTIVE KEY 10 tanker truck fluid level control system
15 tanker truck
20 tank
25 control valve
26 solenoid
27 pump
28 fluid line 30 level indicating system
31 inductive float sensor
35 main control box
39 parking brake
40 wiring harness
41 electrical cable
42 male plug
43 female plug
50 thermocouple
55 contained liquid product
60 weatherproof control enclosure
65 front panel
70 power switch
80 operating mode switch
90 incoming fluid temperature readout
95 audible alarm device
100 visual alarm device
110 temperature indication circuit
115 first display driver circuit

DETAILED DESCRIPTION OF THE PREFERRED EMBODIMENT

Figure 2:
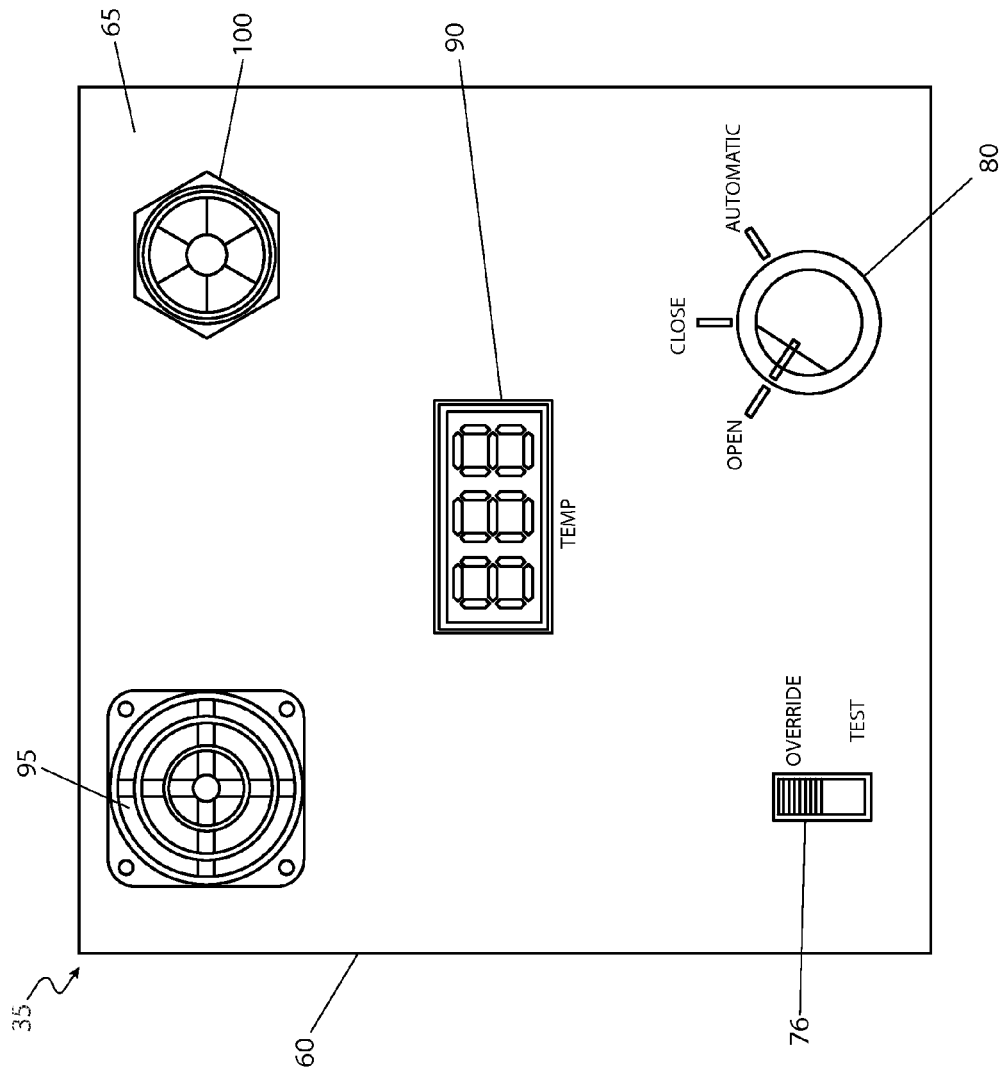
FIG. 2 is a front view of the main control box 35, as used with the tanker truck fluid level control system 10, according to the preferred embodiment of the present invention; and, FIG. 3 is an electrical schematic block diagram depicting the major electrical components of the tanker truck fluid level control, according to the preferred embodiment of the present invention.
Figure 3:
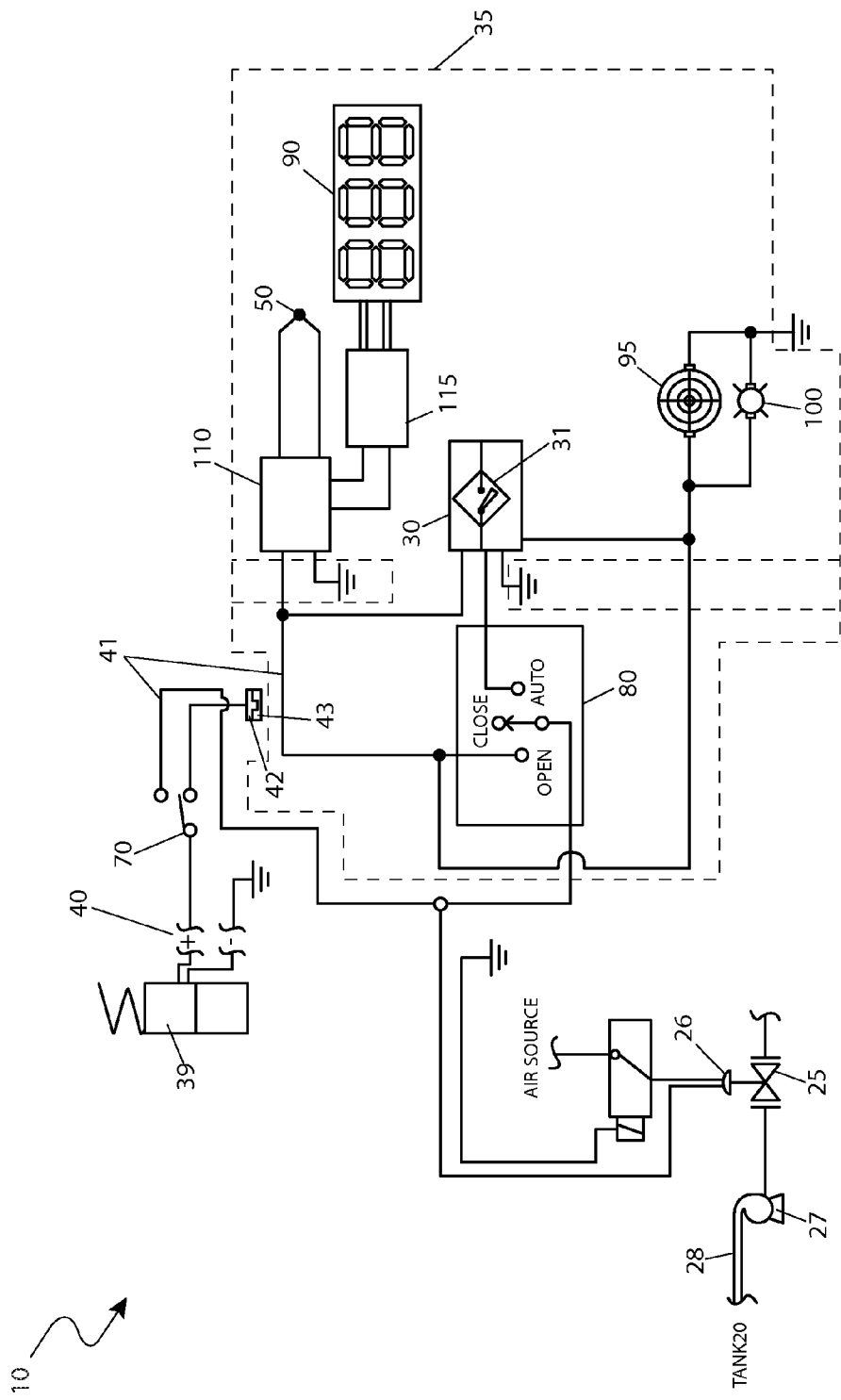

The best mode for carrying out the disclosure is presented in terms of a preferred embodiment, herein depicted within FIGS. 1 through 3. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a tanker truck fluid level control system (herein described as the "system") 10, which provides a means for monitoring and automatically controlling the level of oil in a tank 20 of a tanker truck 15, thereby preventing an overfilling event due to human error. The system 10 would be constructed in general accordance with FIG. 1 through FIG. 3 and may be provided as new or optional equipment on a new tanker truck 15 or could also be provided as an add-on aftermarket kit for installation on an existing tanker truck 15.

Referring now to FIG. 1, a side view of the system 10 as provided upon the tanker truck 15, according to the preferred embodiment of the present invention, is disclosed. The tanker truck 15 is preferably a conventional vehicle which is hauled by a semi-tractor as illustrated herein. However, any type of tanker truck 15 or tanks 20 that are stationary for that manner can be used with the functionality of the system 10. As such, the usage of any specific type of tanker truck 15 should not be interpreted as a limiting factor of the present invention. The tanker truck 15 is provided with a tank 20 and a method to fill it which is commonly a fluid or product pump 27.

The flow of liquid material into the tank 20 is governed by an air-operated spring control valve 25 as would be conventionally expected. The control valve 25 would preferably be included with the pump 27 on an inlet which pumps fluid into the tank 20 via a length of fluid line 28. Additionally, also in a conventional manner, the tank 20 is provided with a level indicating system 30 which preferably comprises an inductive float sensor 31 or a similar proximity switch to determine when the tank 20 is filled to a maximum capacity. When filled to a maximum capacity, such as when the fluid reaches the inductive float sensor 31 and the parking brake 39 is applied within the tanker truck 15, a positive air shutdown will stop the tanker truck 15 engine and operate a solenoid 26 within the pump 27 intake to discontinue the flow of fluid and eliminating overfilling the tank 20.

The tanker truck 15 interfaces to various other electro/mechanical components of the system 10 via interconnection of electrical cable 41 to a wiring harness 40 on the tanker truck 15 which supplies electrical power to the system 10. The electrical wiring 41 is specifically interconnected to the existing parking brake 39 to the wiring harness 40, thereby providing an enabling signal in correspondence with a main control box 35. Further, this setup will only enable the system 10 to operate when the parking brake 39 is set which will discontinue operation or halt operation if said parking brake 39 is not set. An interface created with the electrical cable 41 is also provided to a thermocouple 50 or similar temperature sensor to allow for monitoring of the temperature of a contained liquid product 55 within the tank 20 such as oil or the like. As oil heats it begins to foam or bubble which will falsely identify the tank 20 as being full and an inductive flat sensor 31 with stop pumping said oil. The thermocouple 50 along with an incoming fluid temperature readout 90 (see FIG. 2) will enable a user or an operator to determine such a premature stopping of the system 10. Electrical interfaces are also provided to the air-operated control valve 25 and the level indicating system 30 via the electrical cable 41 as well.

A main control box 35 is located in a prominent and readily visible location which is illustrated herein upon an exterior surface of the tank 20. It should be noted that the location of the control box 35 that is illustrated in FIG. 1, is for illustrative purposes only and is not intended to be a limiting factor of the present invention. The main control box 35 is removable attachable to the power supply via a male plug 42 and female plug 43 which further connected to electrical cable 41. The plugs 42, 43 are preferably common four (4) pin connecting devices, yet other means of interconnection may be utilized without limiting the scope of the system 10. The functionally and operation of the main control box 35 will be described in greater detail herein below.

Referring now to FIG. 2, a front view of the main control box 35, as used with the system 10, according to the preferred embodiment of the present invention, is disclosed. The main control box 35 consists of a weatherproof control enclosure 60 approximately twelve (12) inches by twelve (12) inches by six (6) inches. The main control box 35 comprises a flat front panel 65 upon a front surface which further includes a plurality of features which pertain to the operation of the system 10. It should be noted that the weatherproof control enclosure 60 as well as all components mounted upon the front panel 65 are a weatherproof design suitable for the environment and temperatures likely to be encountered while on the road.

The front panel 65 comprises a power switch 70 which is preferably a sliding multi-position electrical switching device which enables the system 10 to be positioned into an OVERRIDE mode or a TEST mode. The TEST mode is provided to allow the user to test the system 10 which verifies a proper operation of said system 10. The TEST mode should be part of periodic test program to ensure proper operation. The OVERRIDE mode enables the lines of the product pump 27 to be emptied when the inductive float sensor 31 has been tripped which will allow for a clean disconnect from a fuel wellhead. An audible alarm device 95 and a visual alarm device 100 will alert the user or operator when the system 10 is positioned in the OVERRIDE mode or TEST mode (see herein below).

An operating mode switch 80 is also provided on the front panel 65 comprising three (3) individual modes of operation. The first position allows the user to keep the air-operated control valve 25 open at all times such as during manual operation, emergency operation, or other similar functions. The second position allows the user to keep the air-operated control valve 25 closed at all times and would be the position that the operating mode switch 80 is normally left in when the system 10 is not in use. It should also be noted that the air-operated control valve 25 is a fail safe design that remains closed when either the loss of power or loss of air pressure occurs. The third and final position of the operating mode switch 80 allows for the automatic operation of the system 10 such that the air-operated control valve 25 is closed when the level of the tank 20 (as shown in FIG. 1) approaches that of a filled position during the filling process. In such a manner, this assures that overflowing of the tank 20 via continued flowing of product into the tank 20 is impossible. Further explanation of the method of accomplishment of this task will be described in greater detail herein below.

The front panel 65 also contains provisions for mounting of an incoming fluid temperature readout 90 which will display the temperature of the incoming fluid as present at the air-operated control valve 25 in either Fahrenheit or Centigrade readings. The incoming fluid temperature readout 90 works together with the thermocouple 50 within the control valve 25. The incoming fluid temperature readout 90 will provided valuable information to the user operator by providing information on temperature, viscosity, melting points, and the like. It should be noted that while the incoming fluid temperature readout 90 is depicted as digital numerical readouts such as discrete readouts, alphanumeric readouts, analog readouts, or the like can be used with equal effectiveness, and as such, should not be interpreted as a limiting factor of the present invention.

An audible alarm device 95 and a visual alarm device 100 are located at an upper surface of the front panel 65 and provide both audible and visual annunciation of an overflow condition local to the main control box 35. Such annunciation will allow the user or operator to take corrective action to eliminate, reduce or mitigate the overflow condition. Such alarm devices 95, 100 will continue until the user corrects the condition or deactivates the system 10. The audible alarm device 95 is speaker device which will broadcast an alerting sound or warning signal and the visual alarm device 100 is an illuminating device such as a light emitting diode (LED).

Referring now, to FIG. 3, an electrical schematic block diagram depicting the major electrical components of the system 10, according to the preferred embodiment of the present invention, is disclosed. Electrical power is routed from the wiring harness 40 when the parking brake 39 is activated through the power switch 70 which enables the user or operator to position the system 10 in OVERRIDE mode or TEST mode which utilizes the alarm devices 95, 100. This controlled power is then routed to a temperature indication circuit 110 which receives an input signal from the thermocouple 50. The resultant signal is then passed to a first display driver circuit 115 which generates an appropriate signal for the incoming fluid temperature readout 90.

Power is also routed to the inductive float sensor 31 in the level indicating system 30 which enables said float sensor 31 to indicate when the tank 20 is full. Power is also routed to the operating mode switch 80. With the operating mode switch 80 in the AUTOMATIC setting the signal is used to open and close the air-operated control valve 25. The OPEN setting of the operating mode switch 80 applies power to the air-operated control valve 25 all the time to keep it open at all times Likewise, the CLOSE position of the operating mode switch 80 removes all power from the air-operated control valve 25 at all times thus allowing the air-operated control valve 25 to return to its failsafe position of being closed at all times.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After installation and wiring in accordance with FIG. 1 and FIG. 3, the system 10 is ready for operation.

The method of installing and utilizing the system 10 may be achieved by performing the following steps: acquiring the system 10; activating the tanker truck 15 parking brake 39; placing the operating mode switch 80 in the CLOSE position; testing the system 10 by positioning the power switch 70 in TEST mode and enabling the alarm devices 95, 100 to create an alerting signal; positioning the operating mode switch 80 in either the OPEN or AUTOMATIC position depending on the mode of operation (in the OPEN position, the contained liquid product 55 would flow into the tank 20 in a conventional manner thus relying on the user to prevent overflow conditions and in the AUTOMATIC mode, the system 10, via use of the level indicating system 30 would control the operation of the air-operated control valve 25 and close it automatically when the level of the contained liquid product 55 in the tank 20 reaches the full level); utilizing the temperature information of the contained liquid product 55 as displayed by the incoming fluid temperature readout 90 in the decision making process; enabling the system 10 to stop pumping fluid into the tank 20 via activation of the inductive float sensor 31 and positioning the power switch 70 to OVERRIDE to clean the product pump 27 before disconnect; and, deactivating the system 10 by releasing the tanker truck 15 parking brake 39 as desired.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A tanker truck fluid level control system for monitoring and automatically controlling a level of oil in a tank of a tanker truck and thereby preventing an overfilling event, said tanker truck fluid level control system comprising:

an air-operated control valve adapted to be in communication with the tank;

a pump having a solenoid valve for pumping oil into the tank;

a level indicating system including a float sensor for detecting a maximum capacity of the tank;

a parking brake adapted to be coupled to the tanker truck; and, a main control box communicatively coupled to said parking brake and adapted to be positioned on an exterior of the tank;

wherein, upon the oil reaching said float sensor and said parking brake of the tanker truck is applied, said air-operated control valve creates a positive air shutdown thereby stopping an engine of the tanker truck and operating said solenoid within said pump to discontinue oil flow into the tank; and, wherein said air-operated control valve is in electrical communication with said level indicating system.

2. The tanker truck fluid level control system of claim 1, wherein said main control box comprises:
   an enclosure;
   a front panel located at a front surface of said enclosure;
   a power switch capable of switching said main control box between a plurality of modes; and,
   at least one alarm device activated when oil overflows beyond a maximum level.

3. The tanker truck fluid level control system of claim 2, wherein said main control box further comprises: an operating mode switch including:
   a first position capable of keeping said air-operated control valve at a continuous open position during pumping conditions;
   a second position capable of keeping said air-operated control valve at a continuous closed position during non-pumping conditions; and,
   a third position capable of providing automatic operation of said system such that said air-operated control valve is closed when the tank level reaches a filled position during the pumping process.

4. The tanker truck fluid level control system of claim 3, wherein said main control box comprises:
   a temperature sensor generating an input signal containing a temperature of the oil at said air-operated control valve;
   a temperature indication circuit communicatively coupled to said temperature sensor and receiving said input signal from said temperature sensor;
   a first display driver circuit generating a display signal upon receiving said input signal; and,
   a fluid temperature readout communicatively coupled to said first display driver circuit and displaying said display signal.

5. A tanker truck fluid level control system for monitoring and automatically controlling a level of oil in a tank of a tanker truck and thereby preventing an overfilling event, said tanker truck fluid level control system comprising:
   an air-operated control valve adapted to be in communication with the tank;
   a pump having a solenoid valve for pumping oil into the tank, said pump being communicatively coupled to said air-operated control valve;
   a level indicating system including a float sensor for detecting a maximum capacity of the tank, said float sensor adapted to be mounted to an outside face of the tank;
   a parking brake adapted to be coupled to the tanker truck; and,
   a main control box communicatively coupled to said parking brake and adapted to be positioned on an exterior of the tank;
   wherein, upon the oil reaching said float sensor and said parking brake of the tanker truck is applied, said air-operated control valve creates a positive air shutdown thereby stopping an engine of the tanker truck and operating said solenoid within said pump to discontinue oil flow into the tank;
   wherein said air-operated control valve is in electrical communication with said level indicating system.

6. The tanker truck fluid level control system of claim 5, wherein said main control box comprises:
   an enclosure;
   a front panel located at a front surface of said enclosure;
   a power switch capable of switching said main control box between a plurality of modes; and,
   at least one alarm device activated when oil overflows beyond a maximum level.

7. The tanker truck fluid level control system of claim 6, wherein said main control box further comprises: an operating mode switch including:
   a first position capable of keeping said air-operated control valve at a continuous open position during pumping conditions;
   a second position capable of keeping said air-operated control valve at a continuous closed position during non-pumping conditions; and,
   a third position capable of providing automatic operation of said system such that said air-operated control valve is closed when the tank level reaches a filled position during the pumping process.

8. The tanker truck fluid level control system of claim 7, wherein said main control box comprises:
   a temperature sensor generating an input signal containing a temperature of the oil at said air-operated control valve;
   a temperature indication circuit communicatively coupled to said temperature sensor and receiving said input signal from said temperature sensor;
   a first display driver circuit generating a display signal upon receiving said input signal; and,
   a fluid temperature readout communicatively coupled to said first display driver circuit and displaying said display signal.

9. A method of utilizing a tanker truck fluid level control system for monitoring and automatically controlling a level of oil in a tank of a tanker truck and thereby preventing an overfilling event, said method comprising the steps of:
   providing and communicatively coupling an air-operated control valve with the tank;
   providing a pump having a solenoid valve for pumping oil into the tank;
   communicatively coupling said pump to said air-operated control valve;
   providing a level indicating system including a float sensor for detecting a maximum capacity of the tank;
   mounting said float sensor to an outside face of the tank;
   a parking brake adapted to be coupled to the tanker truck;
   a main control box communicatively coupled to said parking brake;
   positioning said main control box on an exterior of the tank; and,
   upon the oil reaching said float sensor and said parking brake of the tanker truck is applied, said air-operated control valve creating a positive air shutdown thereby stopping an engine of the tanker truck and operating said solenoid within said pump to discontinue oil flow into the tank;
   wherein said air-operated control valve is in electrical communication with said level indicating system.

* * * * *